Patented Feb. 23, 1937

2,071,938

UNITED STATES PATENT OFFICE 2,071,938

BLANC FIXE AND METHOD OF MAKING SAME

James B. Pierce, Jr., Charleston, W. Va., assignor to Barium Reduction Corporation, Charleston, W. Va., a corporation of Delaware No Drawing. Application March 30, 1933, Serial No. 663,495

5 Claims. (Cl. 134—58)

This invention relates to improving the color and other characteristics of precipitated barium sulphate commonly termed blanc fixe and has for its particular objects the provision of a simple, cheap and effective method whereby the color of dry blanc fixe pigment obtained by any suitable precipitation method, such for example as described in my various prior patents, including among others Patents Nos. 1,457,934, 1,468,867 and 1,765,737, can be very materially improved without substantially raising the oil absorption qualities thereof or otherwise deleteriously affecting the properties of the blanc fixe.

Heretofore, by whatever precipitation method blanc fixe has been commercially made, it has been found to be virtually impossible to avoid the presence in the dry pigment of minute quantities of color imparting metallic sulphides, more especially iron sulphide, and as a consequence there was a tendency when such blanc fixe was ground with oil, varnish or water for the same to be thrown off color, so to speak. This off-color tendency or characteristic of blanc fixe has been found to be especially objectionable in the ink, paper coating and paint industries wherein large quantities of a suitable blanc fixe can be advantageously employed.

My investigations have led to the discovery that blanc fixe, such for example as that prepared in accordance with the precipitation methods described in my patents above enumerated, can be greatly improved in color, both in the dry state, as well as from the standpoint of the so-called rub-out effect, produced with oil, varnish or water, if such blanc fixe product in the form of a dry powder is subjected to a controlled calcining operation as hereinafter set forth.

In carrying out my invention, I preferably proceed as follows:—

Dry blanc fixe prepared by any suitable precipitation method which produces a product comparable in its physical characteristics with that produced in accordance with the precipitation methods described in my aforesaid patents, is subjected to a controlled calcining operation performed in any suitable kiln, or while the same is being carried by a suitable conveyor belt, the temperature during the principal portion of the calcining operation being maintained preferably between 340° C. and 360° C., but below 450° C. and sufficiently high to completely decompose or decolorize the color-imparting inorganic sulphides, such as iron sulphides and other color-imparting compounds.

The temperature attained during such calcination should exceed 250° C. as otherwise it is impossible to insure that the deleterious color-imparting compounds will be rendered entirely inert and on the other hand, if the temperature during such calcination is maintained for any considerable length of time in excess of 450° C. or even at a so-called red heat, the whole character of the resultant blanc fixe is materially altered and more especially an objectionable shrinkage in volume of the resultant product will occur, such, for example, as explained in my aforesaid Patent No. 1,765,737, with corresponding changes in the properties being consequently imparted thereto.

My improved blanc fixe produced in accordance with the controlled calcining operation herein described possesses, as above noted, a greatly improved color specification when in the dry state, and when such product is rubbed out with oil, varnish or water, the so-called resultant rub-out is unusually white and extremely bright or brilliant, these characteristics being readily discernible when rub-slides of my improved product and ordinary blanc fixe, not so processed, are compared under a microscope. Furthermore, my improved product preserves substantially unimpaired its low oil absorption qualities that are inherent to such blanc fixe products produced by the methods described in my aforesaid patents and this characteristic is especially desirable and even indispensable in the production of paints and inks. Should a temperature of say 400° C. be substantially exceeded, say a temperature of 450° C. be attained for any appreciable time during such calcination, while the color of the product so obtained will be quite satisfactory, nevertheless, the oil absorption index of the resultant product will rise very considerably, approximating some 25% in excess of that of my improved product.

The term "calcining" as herein employed refers to a heating operation which destructively decomposes or decolorizes objectionable color-imparting compounds, such as metallic sulphides, without destructive decomposition or volatilization of the blanc fixe.

While I have described the preferred method of procedure employed by me and the properties of the resultant product obtained by following the same, various modifications or variations therefrom within the scope of the appended claims may be made without departing from the spirit of my invention.

Having thus described my invention, what I claim and desire to obtain by United States Letters Patent is:

1. The dry method of improving the color of precipitated blanc fixe containing objectionable color-imparting compounds, consisting essentially of iron sulphide, which consists in heating such dry blanc fixe to a temperature between 250° C. and 450° C. for a sufficient time to substantially destroy and thereby decolorize such color-imparting compounds contained therein without affecting the removal of the metal element of such contained sulphide or substantially affecting the oil absorption characteristics of the blanc fixe so treated.

2. The dry method of improving the color of precipitated blanc fixe containing objectionable color-imparting compounds consisting essentially of iron sulphide, which consists in heating such dry blanc fixe to a temperature between 300° C. and 400° C. for a sufficient time to substantially destroy and thereby decolorize such color-imparting compounds contained therein and then, without otherwise effecting the removal of the metal element of such contained sulphide or substantially affecting the oil absorption characteristics of the blanc fixe so treated, recovering the resultant calcined product.

3. The dry method of improving the color of precipitated blanc fixe containing objectionable color-imparting compounds comprising essentially iron sulphide, which consists in heating such dry blanc fixe to a temperature between 325° C. and 375° C. for a sufficient time to calcine and vitiate such color-imparting compounds contained therein and then, without otherwise effecting the removal of the metal element of such contained sulphide or substantially affecting the oil absorption characteristics of the blanc fixe so treated, recovering the resultant calcined product.

4. The dry method of improving the color of precipitated blanc fixe containing objectionable color-imparting compounds comprising essentially iron sulphide, which consists in heating such dry blanc fixe to a temperature between 340° C. and 360° C. for a sufficient time to calcine and vitiate such color-imparting compounds contained therein and then, without otherwise effecting the removal of the metal element of such contained sulphide or substantially affecting the oil absorption characteristics of the blanc fixe so treated, recovering the resultant calcined product.

5. A low oil-absorption, precipitated, brilliant white blanc fixe produced solely by subjecting blanc fixe containing iron sulphide as a color-imparting impurity to a dry calcining operation at a temperature between 250° C. and 450° C. and which product is characterized by the presence therein of an amount of a calcined colorless iron compound which, if present in the form of its equivalent weight of iron sulphide, would impart a coloration to the rub-out product obtained by rubbing up such blanc fixe with water that would be decidedly objectionable and decidedly off color from pure white and such blanc fixe preserving the oil-absorption characteristics of the original blanc fixe from which the same was prepared.

JAMES B. PIERCE, Jr.